US009325476B2

(12) United States Patent
Li et al.

(10) Patent No.: US 9,325,476 B2
(45) Date of Patent: Apr. 26, 2016

(54) METHOD AND APPARATUS FOR TRANSMITTING HARQ-ACK

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 107 days.

(21) Appl. No.: 13/949,906

(22) Filed: Jul. 24, 2013

(65) Prior Publication Data

US 2014/0044025 A1    Feb. 13, 2014

(30) Foreign Application Priority Data

Jul. 24, 2012   (CN) .......................... 2012 1 0258428
May 24, 2013   (CN) .......................... 2013 1 0197144

(51) Int. Cl.
| H04L 1/00 | (2006.01) |
| H04L 5/00 | (2006.01) |
| H04L 5/14 | (2006.01) |
| H04L 1/18 | (2006.01) |

(52) U.S. Cl.
CPC ............ *H04L 5/0055* (2013.01); *H04L 1/1854* (2013.01); *H04L 5/001* (2013.01); *H04L 5/1469* (2013.01); *H04L 1/1812* (2013.01)

(58) Field of Classification Search
USPC ......... 370/216, 229, 230, 236, 252, 242, 280, 370/468
See application file for complete search history.

(56) References Cited

U.S. PATENT DOCUMENTS

| 2011/0176461 | A1* | 7/2011 | Astely et al. .................. 370/280 |
| 2011/0211503 | A1  | 9/2011 | Che et al. |
| 2013/0083753 | A1* | 4/2013 | Lee et al. ..................... 370/329 |
| 2013/0194982 | A1* | 8/2013 | Fwu et al. ..................... 370/280 |
| 2013/0272170 | A1* | 10/2013 | Chatterjee et al. ............ 370/280 |
| 2013/0279356 | A1* | 10/2013 | Park et al. .................... 370/252 |
| 2013/0301490 | A1* | 11/2013 | He et al. ....................... 370/280 |

(Continued)

FOREIGN PATENT DOCUMENTS

| CN | 102271032 | 12/2011 |
| WO | WO 2012/108720 | 8/2012 |

OTHER PUBLICATIONS

Ericsson et al., "Remaining PDSCH HARQ Timing Issues in Aggregation of TDD Carriers with Different UL/DL Configurations", R1-121014, 3GPP TSG-RAN WG1 #68bis, Mar. 22, 2012.

(Continued)

*Primary Examiner* — Kwang B Yao
*Assistant Examiner* — Nguyen Ngo
(74) *Attorney, Agent, or Firm* — The Farrell Law Firm, P.C.

(57) ABSTRACT

An apparatus and a method are provided for transmitting a Hybrid Automatic Repeat reQuest ACKnowledgement (HARQ-ACK) in a Time Division Duplexing (TDD) Carrier Aggregation (CA) system, wherein the duplex direction of a sub frame may change flexibly. According to the method, a UE receives configuration information from a base station for each cell working under a CA mode; determines a distribution of fixed sub frames and flexible sub frames in each cell; determines timing of a HARQ-ACK for downlink transmission in each cell; and transmits the HARQ-ACK, based on the determined timing of the HARQ-ACK for each cell.

19 Claims, 2 Drawing Sheets

(56) References Cited

U.S. PATENT DOCUMENTS

| | | | |
|---|---|---|---|
| 2013/0315114 A1* | 11/2013 | Seo et al. | 370/280 |
| 2013/0322343 A1* | 12/2013 | Seo et al. | 370/328 |
| 2014/0122957 A1* | 5/2014 | Charbit et al. | 714/748 |
| 2014/0185539 A1* | 7/2014 | Seo et al. | 370/329 |
| 2014/0204961 A1* | 7/2014 | Hooli et al. | 370/476 |
| 2014/0293909 A1 | 10/2014 | Xu et al. | |
| 2015/0063250 A1* | 3/2015 | Lahetkangas et al. | 370/329 |

OTHER PUBLICATIONS

Nokia Siemens Networks et al., "Views on Inter-band CA with Different TDD Configurations on Different Bands", R1-120708, 3GPP TSG-RAN WG1 Meeting #68, Feb. 6, 2012.

Gatt, "TDD Inter-band Carrier Aggregation", R1-120091, 3GPP TSG RAN WG1 Meeting #68, Feb. 6, 2012.

European Search Report dated Feb. 18, 2016 issued in counterpart application No. 13823674.0-1851, 9 pages.

* cited by examiner

METHOD AND APPARATUS FOR TRANSMITTING HARQ-ACK

PRIORITY

This application claims priority under 35 U.S.C. §119(a) to Chinese Patent Application Nos. 201210258428.7, 201210276182.6, and 201310197144.6, which were filed in the State Intellectual Property Office of the People's Republic of China on Jul. 24, 2012, Aug. 3, 2012, and May 24, 2013, respectively, the content of each of which is incorporated herein by reference.

BACKGROUND OF THE INVENTION

1. Field of the Invention

The present invention relates generally to mobile communications, and more particularly, to a method and an apparatus for transmitting a Hybrid Automatic Repeat reQuest ACKnowledgement (HARQ-ACK) in a Time Division Duplexing (TDD) Carrier Aggregation (CA) system, where distribution of a sub frame changes flexibly.

2. Description of the Related Art

A Long Term Evolution (LTE) system supports a working mode of TDD.

FIG. 1 illustrates a frame structure in a conventional LTE TDD system.

Referring to FIG. 1, each radio frame has a length of 10 ms and is equally divided into two half frames of 5 ms. Each half-frame includes 8 slots, each of which has a length of 0.5 ms, and 3 special fields, i.e., a Downlink Pilot Time Slot (DwPTS), a Guarding Period (GP), and an Uplink Pilot Time Slot (UpPTS). The 3 special fields have a total length of 1 ms.

Each sub frame (sub frame 0 to sub frame 9) includes two consecutive time slots, i.e., a k'th sub frame includes a time slot 2k and a time slot 2k+1.

A TDD system supports 7 types of UpLink/DownLink (UL/DL) configurations, as shown in Table 1 below.

In Table 1, D represents a downlink sub frame, U represents an uplink sub frame, and S represents a special sub frame including the 3 special fields, i.e., a DwPTS, a GP, and a UpPTS.

TABLE 1

| Configuration serial number | Switch-point periodicity | Sub-frame ID | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In an LTE TDD system, resource allocation is performed in units of Physical Resource Blocks (PRBs). Each PRB includes 12 consecutive sub carriers in the frequency domain and occupies one time slot in the time domain.

In a downlink sub frame, the first n OFDM symbols are used for transmitting downlink control information, which includes a Physical Downlink Control CHannel (PDCCH) and other control information, and the other symbols, i.e., the symbols following the first n OFDM symbols, are used for transmitting Physical Downlink Shared CHannel (PDSCH).

In subsequent versions of LTE, the concept of an enhanced PDCCH (ePDCCH) has been proposed. An ePDCCH is mapped to a data region in a sub frame to be transmitted. Accordingly, the ePDCCH and the PDSCH are implemented by Frequency Division Multiplexing (FDM). Herein, PDCCH and ePDCCH are not differentiated from each other, unless otherwise specified, and are commonly referred to as PDCCH.

A base station allocates PDSCH resources in one downlink sub frame through a PDCCH, which includes downlink grant signaling. A User Equipment (UE) receives and decodes the PDSCH after receiving the downlink grant signaling, and transmits a HARQ-ACK for the PDSCH in a subsequent uplink sub frame according to a certain timing scheme. Because TDD supports multiple types of UL/DL configurations, a HARQ-ACK for a PDCCH indicating downlink a Semi Permanent Scheduling (SPS) release or for PDSCH in 0 or 1 or multiple downlink sub frames may be fed back within an uplink sub frame n. The index of the downlink sub frames are n-k, where k belongs to a collection K, which is decided by the UL/DL configuration and the uplink sub frame n, as shown in Table 2 below.

TABLE 2

| UL/DL Configuration | index collection K Sub frame index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In an LTE-Advanced (LTE-A) system, multiple Component Carriers (CC) are aggregated to obtain larger working bandwidth, i.e., Carrier Aggregation (CA). The aggregated carriers constitute downlink and uplink links in the communication system, and therefore, larger transmission rates can be achieved.

A base station may configure a UE to work in multiple cells, which include one Primary cell (Pcell) and multiple Secondary cells (Scells).

When multiple aggregated cells use the same UL/DL configuration, HARQ-ACKs for all of the cells are fed back in an uplink sub frame of the Pcell, and the HARQ-ACK timing scheme defined in LTE Release 8 for a cell may be used, as shown in Table 2. However, when the aggregated multiple cells use different UL/DL configurations, HARQ-ACKs for all of the cells are fed back in an uplink sub frame in the Pcell, and the timing scheme according to one of the 7 conventional UL/DL configurations, as shown in Table 1, are used as the timing scheme for PDSCH in the Scells.

Table 3 may be used to determine the TDD UL/DL configuration whose HARQ-ACK timing scheme is to be used for downlink transmission of an Scell for each combination of a TDD UL/DL configuration of the Pcell and a TDD UL/DL configuration of the Scell.

TABLE 3 determining TDD UL/DL configuration for HARQ-ACK timing

| Reference UL/DL configuration for timing of HARQ-ACK in Scell | | UL/DL configuration of Pcell | | | | | | |
|---|---|---|---|---|---|---|---|---|
| | | 0 | 1 | 2 | 3 | 4 | 5 | 6 |
| UL/DL configuration of Scell | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

In conventional LTE TDD standards, the UL/DL configuration used by a cell is configured via broadcast signaling, i.e., is included in a System Information Block 1 (SIB1). As such, the LTE system supports at least 640 ms between changes of UL/DL configurations and at most 32 changes of system information in every 3 hours according $3^{rd}$ to conventional standards. To improve for fast changes in service characteristics, Generation Partnership Project (3GPP) is currently working on methods that support faster changes in distribution of UL/DL sub frames in the system. For example, a new method may change UL/DL configuration at a faster pace, e.g., every 200 ms; or change UL/DL configuration at intervals of 10 ms, which equals the length of a radio frame.

In practice, a base station scheduler may change the distribution of UL/DL sub frames according to service demands, and keep the system running properly by adopting certain scheduling restrictions. A UE does not have to know which of the 7 UL/DL configurations it is running under. Further, the distribution of working UL/DL sub frames is not necessarily limited to the 7 UL/DL configurations shown in Table 1, i.e., the actual distribution of UL/DL sub frames may be transparent to UEs.

In a CA system, when the distribution of UL/DL sub frames in some or all of the cells can change flexibly, both a base station and a UE need to correctly determine the timing of HARQ-ACK for PDSCH in each cell to allow the UE to correctly send a HARQ-ACK in an uplink direction and allow the base station to correctly receive the HARQ-ACK sent by the UE, such that downlink HARQ transmission can be implemented properly.

SUMMARY

Accordingly, the present invention is designed to address at least the problems and/or disadvantages described above and to provide at least the advantages described below.

An aspect of the present invention is to provide a method and an apparatus for transmitting HARQ-ACK in a TDD CA system, where a duplex direction of a sub frame changes flexibly.

In accordance with an aspect of the present invention, a method is provided for transmitting HARQ-ACK in a TDD CA system, wherein a duplex direction of a sub frame changes flexibly. The method includes receiving, by a UE, configuration information from a base station for each cell working under a CA mode; determining, by the UE, distribution of fixed downlink sub frames and flexible sub frames in each cell; determining timing of HARQ-ACK for downlink transmission in each cell; and transmitting, by the UE, the HARQ-ACK, based on the determined timing of the HARQ-ACK for each cell.

In accordance with another aspect of the present invention, an apparatus is provided for transmitting a HARQ-ACK in a TDD CA system, wherein a duplex direction of a sub frame changes flexibly. The apparatus includes a transceiver that is configured to receive configuration information from a base station for each cell working under a CA mode; and a controller that is configured to obtain a distribution of fixed sub frames and flexible sub frames in each cell according to the received configuration information, to determine timing of a HARQ-ACK for a downlink transmission in each cell according to the distribution of the fixed sub frames and the flexible sub frames in each cell, and to feed back, via the transceiver, the HARQ-ACK according to the determined timing of the HARQ-ACK for each cell.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
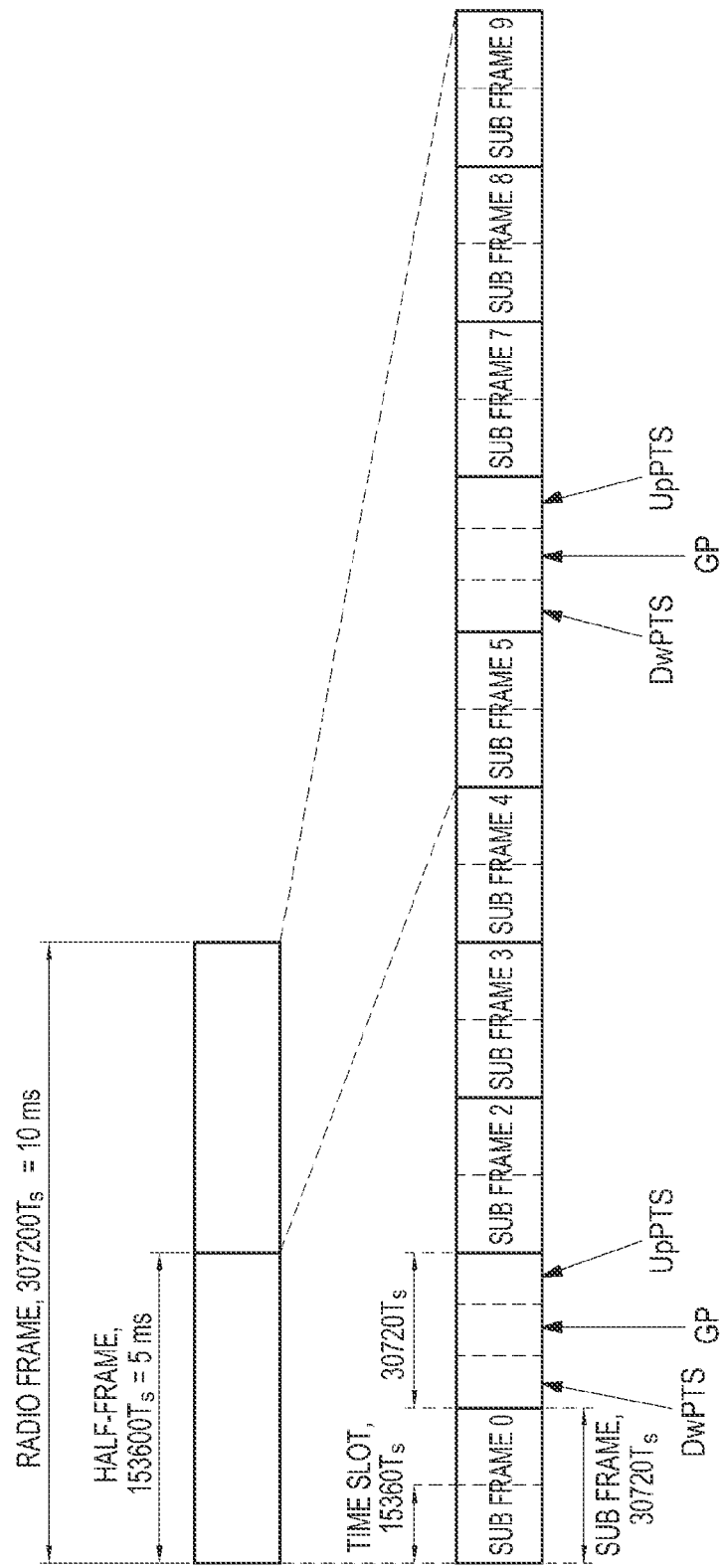
FIG. 1 illustrates a frame structure in a conventional LTE TDD system.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

According to an embodiment of the present invention, changes in a duplex direction of flexible sub frames are independent of the timing of a HARQ-ACK. Consequently, the HARQ-ACK can be correctly transmitted without impacting the flexibility of downlink scheduling.

Further, no new HARQ-ACK timing scheme is introduced; instead, a conventional HARQ-ACK timing scheme of the LTE TDD UL/DL configurations is re-used for the timing of the HARQ-ACK in an Scell, which reduces complexity.

Distribution of UL/DL sub frames of a cell are changed via conventional broadcast signaling according to LTE TDD Release 8/9/10/11. Herein, such a cell is referred to as a cell where distribution of UL/DL sub frames is prohibited from changing flexibly. A cell that supports fast changes in distribution of UL/DL sub frames is referred to herein as a cell where distribution of UL/DL sub frames changes flexibly. In a cell where distribution of UL/DL sub frames changes flexibly, a sub frame whose duplex direction may change is referred to as a flexible sub frame.

In a cell where distribution of UL/DL sub frames changes flexibly, some of the sub frames may have a fixed duplex direction while other sub frames may be flexible sub frames whose duplex directions are changeable. For example, sub frames 0 and 5 and a DwPTS in sub frames 1 and 6 have fixed duplex direction of downlink, and sub frame 2 and a UpPTS in sub frames 1 and 6 have fixed duplex direction of uplink. Whether sub frames 3, 4, 7, 8, and 9 have fixed or flexible duplex directions can be determined according to other information.

If a distribution of UL/DL sub frames of a cell in a single cell system changes flexibly, a TDD UL/DL configuration may be sent in broadcast information SIB1 according to conventional LTE Release 8/9/10/11, which is referred to as SIB1 UL/DL configuration, in order to make all of UEs that do not support flexible sub frames correctly send and receive UL/DL data according to the SIB1 UL/DL configuration. Some of the uplink sub frames in an SIB1 UL/DL configuration are allowed to change into downlink sub frames. Thus, a UE that supports flexible sub frames determines the timing position of a HARQ-ACK for each of the fixed downlink sub frames and the flexible sub frames, in order to transmit downlink HARQ-ACK.

According to an embodiment of the present invention, one of the conventional LTE UL/DL configurations, other than the SIB1 UL/DL configuration, is selected as a reference UL/DL configuration of the cell, on the premise that the downlink sub frames in the reference UL/DL configuration are a superset of the fixed downlink sub frames and flexible sub frames of the cell. Therefore, the timing of a HARQ-ACK for each downlink sub frame of the cell can be determined according to the timing of HARQ-ACK for a downlink sub frame on the same timing position in the foregoing conventional LTE UL/DL configuration. In the following, this method is referred to as determining timing of a HARQ-ACK for a downlink transmission in a single cell system, based on a reference UL/DL configuration of the cell.

In a TDD CA system, one cell, multiple cells, or all of the cells may use flexible distribution of the UL/DL sub frames. As such, a timing position of a HARQ-ACK may be defined for each of the fixed downlink sub frames and flexible sub frames in a cell supporting flexible changes in distribution of UL/DL sub frames, when defining the timing of HARQ-ACK for downlink transmission in the cell. In addition, when transmitting a HARQ-ACK in a cell supporting flexible distribution of UL/DL sub frames, it may be specified that the HARQ-ACK is only transmitted in fixed uplink sub frames of the cell.

In a CA system, the cell where downlink data is transmitted and the cell where uplink HARQ-ACK is fed back may be different cells. For example, in accordance with LTE Release 10/11, downlink data may be transmitted in each cell configured by a base station, but HARQ-ACK may be transmitted only in a Pcell. In LTE Release 10/11, there is only one Pcell in the multiple cells configured for a CA UE. However, in subsequent LTE versions, a UE may have multiple Pcells, and all of the multiple Pcells may be used for transmitting uplink HARQ-ACK. Therefore, in the following description, a Pcell refers to a cell having uplink sub frames that are used by a UE for feeding back HARQ-ACK.

Figure 2:
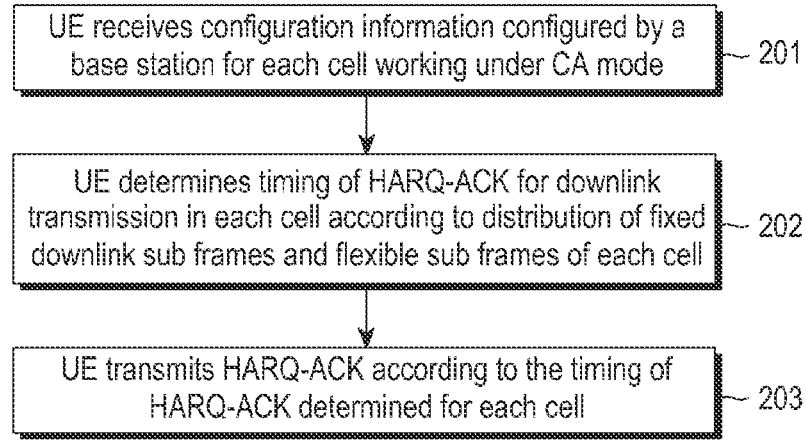
FIG. 2 is a flowchart illustrating a method for transmitting HARQ-ACK according to an embodiment of the present invention.

FIG. 2 is a flowchart illustrating a method for transmitting HARQ-ACK according to an embodiment of the present invention. Specifically, FIG. 2 illustrates a method that is applicable to a TDD CA system where a duplex direction of sub frames changes flexibly.

Referring to FIG. 2, step 201, a UE receives configuration information from a base station for each cell working under a CA mode.

The UE may work in different modes according to whether distribution of UL/DL sub frames may change flexibly in a Pcell and in a Scell. For example, distribution of UL/DL sub frames in a Pcell may be prohibited from changing flexibly, and distribution of UL/DL sub frames in at least one Scell may change flexibly. Alternatively, distribution of UL/DL sub frames in a Pcell may change flexibly, and distribution of UL/DL sub frames in at least one Scell may also change flexibly. Further, distribution of UL/DL sub frames in a Pcell may change flexibly, and distribution of UL/DL sub frames in all of the Scells may change flexibly.

In step 202, the UE determines distribution of fixed downlink sub frames and flexible sub frames in each cell working under the CA mode, and determines timing of HARQ-ACK for downlink transmission in each cell.

The timing of HARQ-ACK for downlink transmission in a Pcell may be determined individually. If the distribution of UL/DL sub frames in the Pcell may change flexibly, one of the conventional LTE TDD UL/DL configurations may be selected as the reference DL configuration of the Pcell in a single cell system (referred to as reference UL/DL configuration A), and the timing of HARQ-ACK for downlink transmission in the Pcell under the CA mode may also be determined according to the reference UL/DL configuration A. If the distribution of UL/DL sub frames in the Pcell is prohibited from changing flexibly, the timing of HARQ-ACK for downlink transmission in the Pcell may be determined according to the UL/DL configuration of the Pcell.

The timing of HARQ-ACK for downlink transmission in each Scell may be determined according to whether distribution of UL/DL sub frames may change flexibly in the Scell and in the Pcell. When a UE is configured with multiple Scells, the timing of HARQ-ACK for downlink transmission in each Scell may be determined as will be described below.

In accordance with an embodiment of the present invention, three situations are provided for an Scell, corresponding to whether the distribution of UL/DL sub frames may change flexibly in the Scell and in the Pcell. In the first situation, a distribution of UL/DL sub frames in the Pcell may change flexibly, and a distribution of UL/DL sub frames in the Scell is prohibited from changing flexibly. In the second situation, a distribution of UL/DL sub frames in the Pcell is prohibited from changing flexibly, and a distribution of UL/DL sub frames in the Scell may change flexibly. In the third situation, distributions of UL/DL sub frames may change flexibly both in the Pcell and in the Scell.

In accordance with an embodiment of the present invention, no new timing scheme of a HARQ-ACK is required, as one of the conventional LTE UL/DL configurations for each Scell is used, which is referred to as a CA mode reference UL/DL configuration of the Scell and is denoted as CA mode reference UL/DL configuration C herein. The timing of HARQ-ACK for downlink transmission in the Scell is determined according to the reference UL/DL configuration C.

In step 203, the UE transmits HARQ-ACK based on the timing of HARQ-ACK determined for each cell.

The method of determining the reference UL/DL configuration C in step 202 for each of the situations will be described below.

For the first situation, where a distribution of UL/DL sub frames in a Pcell may change flexibly, and a distribution of UL/DL sub frames in a Scell is prohibited from changing flexibly, when defining the timing of HARQ-ACK for each downlink sub frame in the Scell, it may be defined that HARQ-ACK is transmitted only in fixed uplink sub frames in the Pcell because the distribution of UL/DL sub frames of the Pcell may change flexibly. Therefore, changes in the duplex direction of a flexible sub frame in the Pcell will have no impact on transmission of HARQ-ACK for each cell in the fixed uplink sub frames of the Pcell. As a result, the flexibility of downlink scheduling is not influenced.

In accordance with an embodiment of the present invention, a method for determining a reference UL/DL configuration C of an Scell includes determining an intersection of fixed uplink sub frames of the Pcell and the uplink sub frames of the Scell, selecting a UL/DL configuration from the conventional LTE TDD UL/DL configurations, based on the premise that uplink sub frames in the UL/DL configuration form a subset of the intersection that makes downlink sub frames of the UL/DL configuration form a superset of downlink sub frames of the Scell, and using the selected conventional LTE TDD UL/DL configuration as the CA mode reference UL/DL configuration C of the Scell. In order to optimize HARQ transmission performance, the set of uplink sub frames in the conventional LTE TDD UL/DL configuration may be the largest subset of the intersection or be identical to the intersection.

For example, the timing of HARQ-ACK for downlink transmission in fixed downlink sub frames and flexible sub frames in the Pcell may be determined according to the reference UL/DL configuration A of the Pcell in a single cell system. Because the set of downlink sub frames of reference UL/DL configuration A of the Pcell is a superset of the set of fixed downlink sub frames and flexible sub frames of the Pcell, an uplink sub frame of the reference UL/DL configuration A corresponds to a fixed uplink sub frame of the UL/DL configuration of the Pcell.

As such, when defining the timing of HARQ-ACK for each downlink sub frame of the Scell, the CA mode reference UL/DL configuration C of the Scell may be obtained according to the reference UL/DL configuration A of the Pcell and UL/DL configuration of the Scell, and the timing of HARQ-ACK for downlink transmission of the Scell may be determined based on the CA mode reference UL/DL configuration C. For example, the mapping relation shown in Table 3 may be re-used.

In accordance with an embodiment of the present invention, the UL/DL configuration of a Pcell in Table 3 may be replaced with the reference UL/DL configuration A of the Pcell to make only those fixed uplink sub frames of the Pcell be used for feeding back HARQ-ACK of the Scell, and the CA mode reference UL/DL configuration C of the Scell, as shown in Table 4 below, may be obtained.

TABLE 4 determining reference UL/DL configuration of Scell for HARQ-ACK timing

| Reference UL/DL configuration C for timing of HARQ-ACK in Scell | Reference UL/DL configuration A of Pcell | | | | | | |
|---|---|---|---|---|---|---|---|
| | 0 | 1 | 2 | 3 | 4 | 5 | 6 |
| UL/DL configuration of Scell 0 | 0 | 1 | 2 | 3 | 4 | 5 | 6 |
| 1 | 1 | 1 | 2 | 4 | 4 | 5 | 1 |
| 2 | 2 | 2 | 2 | 5 | 5 | 5 | 2 |
| 3 | 3 | 4 | 5 | 3 | 4 | 5 | 3 |
| 4 | 4 | 4 | 5 | 4 | 4 | 5 | 4 |
| 5 | 5 | 5 | 5 | 5 | 5 | 5 | 5 |
| 6 | 6 | 1 | 2 | 3 | 4 | 5 | 6 |

Two methods for determining a bundling window of the Scell will be described below.

A first method includes determining a bundling window of a Scell to be a bundling window defined in LTE Release 8 for the CA mode reference UL/DL configuration C, which is for determining the HARQ-ACK timing of the Scell.

A second method includes determining a bundling window of an Scell to be a set of sub frames, each of which is a downlink sub frame in the Scell, in a bundling window defined in LTE Release 8 for the CA mode reference UL/DL configuration C, which is for determining the HARQ-ACK timing of the Scell.

For the second situation, where a distribution of UL/DL sub frames in a Pcell is prohibited from changing flexibly, but the distribution of UL/DL sub frames in a Scell may change flexibly, when defining the timing of HARQ-ACK for each downlink sub frame of the Scell, the timing position of HARQ-ACK may be defined for each of the fixed downlink sub frames and flexible sub frames of the Scell.

In accordance with an embodiment of the present invention, a method of determining the reference UL/DL configuration C of the Scell includes determining an intersection of uplink sub frames of the Pcell and fixed uplink sub frames of the Scell, selecting a UL/DL configuration from conventional LTE TDD UL/DL configurations, based on the premise that uplink sub frames in the UL/DL configuration form a subset of the intersection to make downlink sub frames of the UL/DL configuration form a superset of fixed downlink sub frames and flexible sub frames of the Scell, and using the selected conventional LTE TDD UL/DL configuration as the CA mode reference UL/DL configuration C of the Scell. In order to optimize HARQ transmission performances, the set of uplink sub frames in the conventional LTE TDD UL/DL configuration may be the largest subset of the intersection or be identical to the intersection.

A conventional LTE TDD UL/DL configuration, in which downlink sub frames form a superset of fixed downlink sub frames and flexible sub frames of the Scell, is selected for the Scell as the reference UL/DL configuration B of the Scell. As a result, the timing of HARQ-ACK for all fixed downlink sub frames and flexible sub frames of the Scell is obtained when the timing of HARQ-ACK for each downlink sub frame in the reference UL/DL configuration B is determined.

When the Scell is able to work as the sole serving cell of another UE (i.e., in a single cell system), the reference UL/DL configuration B of the Scell may be the reference UL/DL configuration of another UE for determining the timing of HARQ-ACK for downlink transmission in that situation. When the Scell is unable to work on its own as the sole serving cell of a UE, the reference UL/DL configuration B of the Scell may be used only for determining the CA mode reference UL/DL configuration C of the Scell.

In LTE Release 10/11, the base station sends the actual UL/DL configuration of the Scell, i.e., the UL/DL configuration indicated in the SIB1 signaling of the Scell, to the UE in a signaling message for configuring the Scell of the UE. Because the distribution of UL/DL sub frames of the Scell may change flexibly, the base station may also load information about the SIB1 UL/DL configuration and the reference UL/DL configuration B of the Scell into the configuration signaling message, when configuring the Scell of the UE.

Alternatively, the base station may load information about the SIB1 UL/DL configuration and flexible sub frames of the Scell into the configuration signaling message so that the UE may obtain the reference UL/DL configuration B by using the information about SIB1 UL/DL configuration and the flexible sub frames.

Alternatively, the UE may receive broadcast information from the Scell and obtain the reference UL/DL configuration B of the Scell from the broadcast information.

When defining the timing of HARQ-ACK for each downlink sub frame of the Scell, the CA mode reference UL/DL configuration C of the Scell may be obtained according to the UL/DL configuration of the Pcell and the reference UL/DL configuration of the Scell, and the timing of HARQ-ACK for downlink transmission of the Scell may be determined based on the CA mode reference UL/DL configuration C. For example, the mapping relation as shown in Table 3 may be re-used.

In accordance with an embodiment of the present invention, the UL/DL configuration of an Scell in Table 3 may be replaced with the reference UL/DL configuration B of the Scell, thereby defining timing of HARQ-ACK for each of the fixed uplink sub frames and flexible sub frames of the Scell. The CA mode reference UL/DL configuration C of the Scell as shown in Table 5 may be obtained.

TABLE 5 determining reference UL/DL configuration of Scell for HARQ-ACK timing

| Reference UL/DL configuration C for timing of HARQ-ACK in Scell | | UL/DL configuration of Pcell | | | | | | |
|---|---|---|---|---|---|---|---|---|
| | | 0 | 1 | 2 | 3 | 4 | 5 | 6 |
| Reference UL/DL configuration B in Scell | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

Two methods for determining a bundling window of the Scell will be described below.

The first method includes determining a bundling window of an Scell to be a bundling window as defined in LTE Release 8 for the CA mode reference UL/DL configuration C, which is used for determining the timing of HARQ-ACK.

The second method includes determining a bundling window of an Scell to be a set of sub frames, each of which is a fixed downlink sub frame or a flexible sub frame in the Scell, in a bundling window as defined in LTE Release 8 for the CA mode reference UL/DL configuration C, which is for determining the timing of HARQ-ACK of the Scell. The second method may also include determining a bundling window of an Scell to be a set of sub frames, each of which is also a downlink sub frame in the reference UL/DL configuration B of the Scell, in a bundling window as defined in LTE Release 8 for the CA mode reference UL/DL configuration C, which is for determining the timing of HARQ-ACK of the Scell.

The UE monitors the PDCCH, which is for scheduling downlink transmission of the Scell, in fixed downlink sub frames of the Scell or in both the fixed downlink sub frames and the flexible sub frames, which currently may be used for downlink transmission. If the flexible sub frames of the Scell is indicated in the reference UL/DL configuration B of the Scell, the UE monitors a PDCCH, which is for scheduling downlink transmission of the Scell, in each of the downlink sub frames of the reference UL/DL configuration B.

For the third situation, where distributions of UL/DL sub frames may change flexibly in both the Pcell and the Scell, because the distribution of UL/DL sub frames of the Pcell may change flexibly, HARQ-ACK may be transmitted only in fixed sub frames of the Pcell. Therefore, changes in the duplex direction of a flexible sub frame of the Pcell will have no impact on transmission of HARQ-ACK for each cell in the fixed uplink sub frames of the Pcell. As a result, the flexibility of downlink scheduling will not be influenced.

When a distribution of UL/DL sub frames of an Scell may change flexibly, the timing position of HARQ-ACK may be defined for each of fixed downlink sub frames and flexible sub frames of the Scell, when defining the timing of HARQ-ACK for each downlink sub frame of the Scell.

In accordance with an embodiment of the present invention, a method for determining the reference UL/DL configuration C of the Scell includes determining an intersection of fixed uplink sub frames of the Pcell and fixed uplink sub frames of the Scell, selecting a UL/DL configuration from conventional LTE TDD UL/DL configurations, based on the premise that uplink sub frames in the UL/DL configuration form a subset of the intersection to make downlink sub frames of the UL/DL configuration form a superset of fixed downlink sub frames and flexible sub frames of the Scell, and using the selected conventional LTE TDD UL/DL configuration as the CA mode reference UL/DL configuration C of the Scell. In order to optimize HARQ transmission performances, the set of uplink sub frames in the conventional LTE TDD UL/DL configuration may be the largest subset of the intersection or be identical to the intersection.

As described above, the timing of HARQ-ACK for downlink transmission in fixed downlink sub frames and flexible sub frames of the Pcell may be determined by using the reference UL/DL configuration A of the Pcell in a single cell system, and an uplink sub frame in the reference UL/DL configuration A corresponds to a fixed uplink sub frame in the UL/DL configuration of the Pcell.

A conventional LTE TDD UL/DL configuration, in which downlink sub frames form a superset of the set of fixed downlink sub frames and flexible sub frames of the cell, is selected for the Scell as the reference UL/DL configuration B of the Scell. As a result, the timing of HARQ-ACK for all fixed downlink sub frames and flexible sub frames of the Scell is obtained when the timing of HARQ-ACK for each downlink sub frame in the reference UL/DL configuration B is determined.

When the Scell is able to work as the sole serving cell of another UE (i.e., in a single cell system), the reference UL/DL configuration B of the Scell may be the reference UL/DL configuration of another UE for determining the timing of HARQ-ACK for downlink transmission in that situation. However, when the Scell is unable to work on its own as the sole serving cell of a UE, the reference UL/DL configuration B of the Scell may be used only for determining the CA mode reference UL/DL configuration C of the Scell.

In LTE Release 10/11, the base station sends the actual UL/DL configuration of the Scell, i.e., the UL/DL configuration indicated in the SIB1 signaling of the Scell, to the UE in a signaling message for configuring the Scell of the UE. Because the distribution of UL/DL sub frames of the Scell may change flexibly, the base station may also load information about the SIB1 UL/DL configuration of the Scell and information about the reference UL/DL configuration B into the configuration signaling message, when configuring the Scell of the UE.

Alternatively, the base station may load information about the SIB1 UL/DL configuration of the Scell and information about flexible sub frames into the configuration signaling message so that the UE may obtain the reference UL/DL configuration B by using the information about SIB1 UL/DL configuration and the information about the flexible sub frames.

Alternatively, the UE may receive broadcast information from the Scell and obtain the reference UL/DL configuration B of the Scell from the broadcast information.

When defining the timing of HARQ-ACK for each downlink sub frame of the Scell, the CA mode reference UL/DL configuration C of the Scell may be obtained according to the reference UL/DL configuration A of the Pcell and reference UL/DL configuration B of the Scell, and the timing of HARQ-ACK for downlink transmission of the Scell may be determined based on the CA mode reference UL/DL configuration C. In this situation, the mapping relation shown in Table 3 may be re-used.

In accordance with an embodiment of the present invention, the UL/DL configuration of Pcell in Table 3 may be replaced with the reference UL/DL configuration A of the Pcell to make HARQ-ACK be fed back only in fixed uplink sub frames of the Pcell. In addition, the UL/DL configuration of an Scell in Table 3 may be replaced with the reference UL/DL configuration B of the Scell, thereby defining timing of HARQ-ACK for each of the fixed downlink sub frames and flexible sub frames of the Scell. The CA mode reference UL/DL configuration C of the Scell as shown in Table 6 may be obtained.

TABLE 6 determining reference UL/DL configuration of Scell for HARQ-ACK timing

| Reference UL/DL configuration C for timing of HARQ-ACK in Scell | | Reference UL/DL configuration A of Pcell | | | | | | |
|---|---|---|---|---|---|---|---|---|
| | | 0 | 1 | 2 | 3 | 4 | 5 | 6 |
| Reference UL/DL configuration B of Scell | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

Two methods for determining a bundling window of the Scell will be described below.

The first method includes determining a bundling window of an Scell to be a bundling window defined in LTE Release 8 for the CA mode reference UL/DL configuration C, which is for determining the HARQ-ACK timing.

The second method includes determining a bundling window of an Scell to be a set of sub frames, each of which is a fixed downlink sub frame or a flexible sub frame in the Scell, in a bundling window defined in LTE Release 8 for the CA mode reference UL/DL configuration C, which is for determining the HARQ-ACK timing of the Scell. The second method may also include determining a bundling window of an Scell to be a set of sub frames, each of which is also a downlink sub frame in the reference UL/DL configuration B of the Scell, in a bundling window defined in LTE Release 8 for the CA mode reference UL/DL configuration C, which is for determining the HARQ-ACK timing of the Scell.

The UE monitors the PDCCH, which is for scheduling downlink transmission of the Scell, only in fixed downlink sub frames of the Scell or in the fixed downlink sub frames and flexible sub frames, which currently may be used for downlink transmission. If the flexible sub frames of the Scell is indicated in the reference UL/DL configuration B of the Scell, the UE monitors a PDCCH, which is for scheduling downlink transmission of the Scell, in each of the downlink sub frames of the reference UL/DL configuration B.

Figure 3:
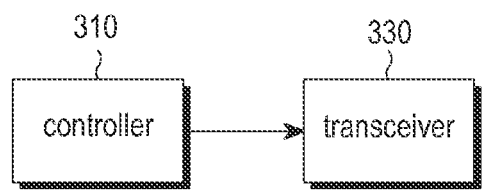
FIG. 3 illustrates an apparatus for transmitting HARQ-ACK according to an embodiment of the present invention.

FIG. 3 illustrates an apparatus for transmitting HARQ-ACK according to an embodiment of the present invention. Specifically, FIG. 3 illustrates an apparatus for transmitting HARQ-ACK, which is applicable to a TDD CA system, wherein a duplex direction of a sub frame may change flexibly.

Referring to FIG. 3, the apparatus includes a controller 310 and a transceiver 330.

The controller 310, e.g., a microprocessor, is configured to receive configuration information from a base station for each cell working under a CA mode via the transceiver 330.

The controller 310 is configured to obtain a distribution of fixed downlink sub frames and flexible sub frames in each cell according to the received configuration information, and to determine timing of HARQ-ACK for downlink transmission in each cell according to the determined distribution of the fixed downlink sub frames and flexible sub frames in each cell.

The transceiver 330 is configured to receive configuration information from a base station and transmit the HARQ-ACK according to the determined timing of the HARQ-ACK for each cell.

In the above-described embodiments of the present invention, duplex directions of flexible sub frames are changed independent from the timing of HARQ-ACK. As such, HARQ-ACK is correctly transmitted without impacting the flexibility of the downlink scheduling. Further, the HARQ-ACK timing schemes from conventional LTE TDD UL/DL configurations are re-used for the HARQ-ACK timing of an Scell, which reduces complexity.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for transmitting a hybrid automatic repeat request acknowledgement (HARQ-ACK) in a time division duplexing (TDD) carrier aggregation (CA) system, the method comprising:
   receiving, by a user equipment (UE), configuration information from a base station for each cell working under a CA mode;
   determining, by the UE, for each secondary cell (Scell), a CA mode reference uplink/downlink configuration C of the Scell working under the CA mode;
   determining timing of a HARQ-ACK for downlink transmission in each cell based on the CA mode reference uplink/downlink configuration C; and
   transmitting, by the LTE, the HARQ-ACK based on the determined timing of the HARQ-ACK for each cell,
   wherein the CA mode reference uplink/downlink configuration C is determined based on:

| Reference uplink/downlink configuration C for timing of HARQ-ACK in Scell | | Reference uplink/downlink configuration A of primary cell (Pcell) | | | | | | |
|---|---|---|---|---|---|---|---|---|
| | | 0 | 1 | 2 | 3 | 4 | 5 | 6 |
| uplink/downlink configuration of Scell | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6. |

2. The method of claim 1, further comprising:
   determining a reference uplink/downlink configuration A of a Pcell in a single cell system and an uplink/downlink configuration of the Scell, if a distribution of uplink/downlink sub frames in the Pcell may change flexibly and a distribution of uplink/downlink sub frames in the Scell is prohibited from changing flexibly.

3. The method of claim 2, further comprising:
determining a bundling window for the Scell based on a bundling window defined in long term evolution (LTE) Release 8 for the CA mode reference uplink/downlink configuration C of the Scell.

4. The method of claim 2, further comprising:
determining a set of sub frames in a bundling window defined in long term evolution (LTE) Release 8 for the CA mode reference uplink/downlink configuration C of the Scell as a bundling window of the Scell,
wherein each of the set of sub frames is a downlink sub frame in the Scell.

5. The method of claim 1, further comprising:
determining an uplink/downlink configuration of a Pcell and a reference uplink/downlink configuration B of the Scell in a single cell system, if a distribution of uplink/downlink sub frames in the Pcell is prohibited from changing flexibly and a distribution of uplink/downlink sub frames in the Scell may change flexibly.

6. The method of claim 5, further comprising:
determining a bundling window for the Scell according to a bundling window defined in long term evolution (LTE) Release 8 for the CA mode reference uplink/downlink configuration C of the Scell.

7. The method of claim 5, further comprising:
determining a set of sub frames in a bundling window defined in long term evolution (LTE) Release 8 for the CA mode reference uplink/downlink configuration C of the Scell as a bundling window of the Scell,
wherein each of the set of sub frames is one of a fixed downlink sub frame and a flexible sub frame in the Scell.

8. The method of claim 5, further comprising:
determining a set of sub frames in a bundling window defined in long term evolution (LTE) Release 8 for the CA mode reference uplink/downlink configuration C of the Scell as a bundling window of the Scell,
wherein each of the set of sub frames is a downlink sub frame in the reference uplink/downlink configuration B of the Scell.

9. The method of claim 5, wherein the reference uplink/downlink configuration B is sent to the UE by the base station through signaling when the Scell is configured.

10. The method of claim 1, further comprising:
determining a reference uplink/downlink configuration A of a Pcell in a single cell system and a reference uplink/downlink configuration B of the Scell in a single cell system, if distributions of uplink/downlink sub frames may change flexibly in the Pcell and the Scell.

11. The method of claim 10, further comprising:
determining a bundling window for the Scell according to a bundling window defined in long term evolution (LTE) Release 8 for the CA mode reference uplink/downlink configuration C of the Scell.

12. The method of claim 10, further comprising:
determining a set of sub frames in a bundling window defined in long term evolution (LTE) Release 8 for the CA mode reference uplink/downlink configuration C of the Scell as a bundling window of the Scell,
wherein each of the set of sub frames is one of a fixed downlink sub frame and a flexible sub frame in the Scell.

13. The method of claim 10, further comprising:
determining a set of sub frames in a bundling window defined in long term evolution (LTE) Release 8 for the CA mode reference uplink/downlink configuration C of the Scell as a bundling window of the Scell,
wherein each of the set of sub frames is a downlink sub frame in the reference uplink/downlink configuration B of the Scell.

14. The method of claim 10, wherein the reference uplink/downlink configuration B is sent to the UE by the base station through signaling when the Scell is configured.

15. The method of claim 1, wherein transmitting the HARQ-ACK comprises, when transmitting the HARQ-ACK in a cell where a distribution of an uplink/downlink sub frame may change flexibly, transmitting the HARQ-ACK in fixed uplink sub frames in the cell.

16. An apparatus for transmitting a hybrid automatic repeat request acknowledgement (HARQ-ACK) in a time division duplexing (TDD) carrier aggregation (CA) system, the apparatus comprising:
a transceiver configured to receive configuration information from a base station for each cell working under a CA mode; and
a controller configured to determine a CA mode reference uplink/downlink configuration C of the Scell working under the CA mode for each secondary cell (Scell), to determine timing of a HARQ-ACK for a downlink transmission in each cell based on the CA mode reference uplink/downlink configuration C, and to feed back, via the transceiver, the HARQ-ACK based on the determined timing of the HARQ-ACK for each cell,
wherein the CA mode reference uplink/downlink configuration C is determined based on:

| Reference uplink/downlink configuration C for timing of HARQ-ACK in Scell | Reference uplink/downlink configuration A of primary cell (Pcell) | | | | | | |
| --- | --- | --- | --- | --- | --- | --- | --- |
| | 0 | 1 | 2 | 3 | 4 | 5 | 6 |
| uplink/downlink configuration of Scell        0 | 0 | 1 | 2 | 3 | 4 | 5 | 6 |
| 1 | 1 | 1 | 2 | 4 | 4 | 5 | 1 |
| 2 | 2 | 2 | 2 | 5 | 5 | 5 | 2 |
| 3 | 3 | 4 | 5 | 3 | 4 | 5 | 3 |
| 4 | 4 | 4 | 5 | 4 | 4 | 5 | 4 |
| 5 | 5 | 5 | 5 | 5 | 5 | 5 | 5 |
| 6 | 6 | 1 | 2 | 3 | 4 | 5 | 6. |

17. The apparatus of claim 16, wherein the controller is further configured to determine a reference uplink/downlink configuration A of a Pcell in a single cell system and an uplink/downlink configuration of the Scell, if a distribution of uplink/downlink sub frames in the Pcell may change flexibly and a distribution of uplink/downlink sub frames in the Scell is prohibited from changing flexibly.

18. The apparatus of claim 16, wherein the controller is further configured to determine an uplink/downlink configuration of a Pcell and a reference uplink/downlink configuration B of the Scell in a single cell system, if a distribution of uplink/downlink sub frames in the Pcell is prohibited from changing flexibly and a distribution of uplink/downlink sub frames in the Scell may change flexibly.

19. The apparatus of claim 16, wherein the controller is further configured to determine a reference uplink/downlink configuration A of a Pcell in a single cell system and a reference uplink/downlink configuration B of the Scell in a single cell system, if distributions of uplink/downlink sub frames may change flexibly in the Pcell and the Scell.

* * * * *